United States Patent
Reason et al.

[19]

[11] Patent Number: 6,141,981
[45] Date of Patent: Nov. 7, 2000

[54] SUPERHEAT CONTROL FOR OPTIMUM CAPACITY UNDER POWER LIMITATION AND USING A SUCTION MODULATION VALVE

[75] Inventors: John Robert Reason, Liverpool; Joao Eduardo Navarro de Andrade, Ciccro, both of N.Y.

[73] Assignee: Carrier Corporation, Syracuse, N.Y.

[21] Appl. No.: 09/277,508

[22] Filed: Mar. 26, 1999

[51] Int. Cl.[7] .................................................. F25B 41/04
[52] U.S. Cl. ............................. 62/225; 62/211; 62/223; 62/230
[58] Field of Search ............................. 62/230, 225, 211, 62/223, 209, 210, 212, 222, 224

[56] References Cited

U.S. PATENT DOCUMENTS

| | | | |
|---|---|---|---|
| 4,134,272 | 1/1979 | Reimann | 62/115 |
| 4,685,309 | 8/1987 | Behr | 62/223 X |
| 4,735,055 | 4/1988 | Taylor et al. | 62/115 |
| 4,903,495 | 2/1990 | Howland et al. | 62/81 |
| 5,067,556 | 11/1991 | Fudono et al. | 165/29 |
| 5,187,944 | 2/1993 | Jarosch | 62/225 |
| 5,291,745 | 3/1994 | Hanson | 62/89 |
| 5,546,756 | 8/1996 | Ali | 62/204 |
| 5,557,938 | 9/1996 | Hanson et al. | 62/126 |
| 5,598,718 | 2/1997 | Freund et al. | 62/238.6 |
| 5,625,276 | 4/1997 | Scott et al. | 322/24 |
| 5,626,027 | 5/1997 | Dormer et al. | 62/175 |
| 5,628,205 | 5/1997 | Rockenfeller et al. | 62/480 |
| 5,661,378 | 8/1997 | Hapeman | 318/52 |
| 5,715,704 | 2/1998 | Cholkeri et al. | 62/527 |
| 5,771,703 | 6/1998 | Rajendran | 62/204 |
| 5,780,998 | 6/1998 | Scott et al. | 322/46 |
| 5,798,577 | 8/1998 | Lesesky et al. | 307/10.7 |
| 5,867,998 | 2/1999 | Guertin | 62/225 |

*Primary Examiner*—Harry B. Tanner
*Attorney, Agent, or Firm*—Niro, Scavone, Haller & Niro

[57] ABSTRACT

A system and process for optimizing the power drawn on a transport refrigeration system under power limitation conditions is disclosed. The invention includes a microprocessor control which adjusts the desired superheat level for the system, thereby altering the expansion valve, thereby limiting the mass flow rate of refrigerant through the system without having a comparable drop in refrigeration capacity as would a similar actuation of the suction modulation valve.

6 Claims, 3 Drawing Sheets

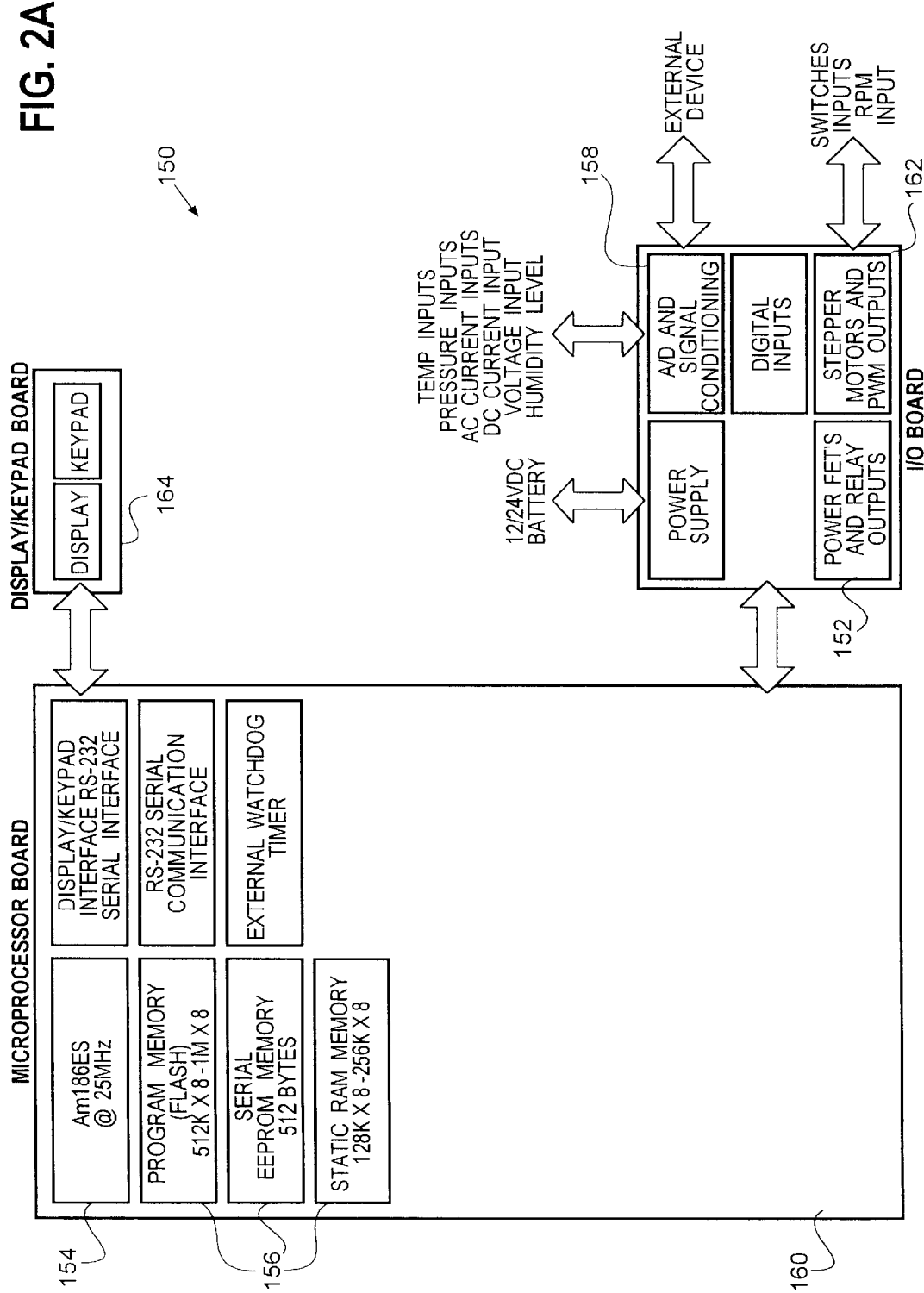

SUPERHEAT CONTROL FOR OPTIMUM CAPACITY UNDER POWER LIMITATION AND USING A SUCTION MODULATION VALVE

I. FIELD OF THE INVENTION

The field of the present invention relates to control systems for transport refrigeration systems. More -specifically, the present invention is directed towards maximizing the system's refrigerating capacity when the system is limited in power capability by adjusting the expansion valve superheat setting.

II. DESCRIPTION OF THE PRIOR ART

A transport refrigeration system used to control enclosed areas, such as the box used on trucks, trailers, containers, or similar intermodal units, functions by absorbing heat from the enclosed area and releasing heat outside of the box into the environment. One problem with the mounting environmental and economic demands placed upon the designers of such systems is that increasing functional demands are placed upon the system while, at the same time, the limitations on the power supply for the system are likewise increasing.

Existing transport refrigeration systems teach the ability to enhance hot gas heating and hot gas defrosting cycles of a transport refrigeration system, while reducing dependency upon the amount of heat absorbed into the accumulator tank of the system.

For instance, U.S. Pat. No. 4,903,495 (Howland et al.) discusses a system wherein the normal thermostatic expansion valve (TXV) of a transport refrigeration system is replaced by a type of TXV which includes a pressure limiter. This type of valve closes when a predetermined maximum desired operating pressure is reached, and is known as a maximum operating pressure or "MOP" valve. However, such devices involve the use of complicated additional hardware including the addition of a secondary condenser and routing for mass flow through such a condenser. In addition, such configurations are not directed towards controlling the transport refrigeration system so as to simultaneously control the flow of refrigerant at the expansion valve so as to limit power consumption while minimizing the drop in system refrigeration capacity.

The inventors of the present invention have recognized the need for a controlled transport refrigeration system which limits the mass flow rate of refrigerant through the system while at the same time avoiding a sharp drop in refrigeration capacity.

III. SUMMARY OF THE INVENTION

The apparatus and control method of this invention provides a refrigeration unit for a transport system having a controller for monitoring and limiting the consumption of power through limiting the mass flow rate of refrigerant. Specifically, the system has certain power supply limits (i.e., the design limitations of the permanent magnet generator while operating in diesel mode or the limitations of house power in electric mode) which are obeyed through an algorithm implemented by the microprocessor of the system controller. This algorithm monitors power (and mass flow rate) indirectly, through the electrical current being drawn by the system. Whenever the current drawn by the system exceeds a certain predetermined limit, the controller issues a signal which reduces the mass flow rate of the system to reduce the current drawn by the system.

In the absence of the control of the present invention, the controller would have to reduce mass flow by gradually closing the suction modulation valve (or "SMV") until the current dropped below the preselected limit. However, the lower mass flow rate caused by the restriction imposed through the SMV results, in addition to lower power consumption, in a sharp drop in refrigerating capacity.

The applicants have found that by restricting the flow of refrigerant at the expansion valve (i.e., prior to the evaporator inlet) results in a comparable reduction in power consumption with a smaller drop in system refrigeration capacity. Therefore, when the system current draw exceeds preselected limits, the controller algorithm of the present invention gradually increases the desired superheat setting which causes the expansion valve to close, thus restricting the flow of refrigerant and reducing power consumption. Preferably, controller continues to increase the desired superheat until either the current draw falls below the limit or a maximum superheat setting is achieved.

Once the current drawn by the system falls below the preselected limit by a set amount, the controller issues further signals gradually decreasing the desired superheat to maximize capacity. Such further controller signals preferably decrease the desired superheat back to its original base value so long as the current drawn by the system remains within acceptable levels. Most preferably, the implementation of these controls maximizes teh position of the suction modulation valve, thus maximizing refrigeration capacity under power limitation conditions.

Accordingly, one objection of the present invention is to provide for the optimization of refrigeration capacity under power limitation conditions.

A further object of the present invention is to optimize refrigeration capacity under power limitation conditions through control of the expansion valve.

Yet another object of the present invention is to provide a process and system for optimizing the refrigeration capacity of a system under power limitation conditions while minimizing or limiting the restriction of the suction modulation valve.

These and other objects, features, and advantages of the present invention will become more apparent in light of the following detailed description of a best mode embodiment thereof, and as illustrated in the accompanying drawings.

BRIEF DESCRIPTION OF THE DRAWING

FIG. 2a shows a block schematic of a second preferred embodiment of a controller of the present invention.

IV. DETAILED DESCRIPTION OF THE INVENTION

The invention that is the subject of the present application is one of a series of applications dealing with transport refrigeration system design and control, the other copending applications including: "Voltage Control Using Engine Speed" (U.S. patent application Ser. No. 09/277,507); "Economy Mode For Transport Refrigeration Units" (U.S. Pat. No. 6,044,651); "Compressor Operating Envelope Management" (U.S. patent application Ser. No. 09/277,473); "High Engine Coolant Temperature Control" (U.S. patent application Ser. No. 09/277,472); "Generator Power Management" (U.S. patent application Ser. No. 09/277,509); and "Electronic Expansion Valve Control Without Pressure Sensor Reading" (U.S. patent application Ser. No. 09/277,333) all of which are assigned to the assignees of the present invention and which are hereby incorporated herein by reference. These inventions are most preferably designed for use in transportation refrigeration systems of the type described in copending applications entitled: "Transport Refrigeration Unit With Non-Synchronous Generator Power System;" Electrically Powered Trailer Refrigeration Unit With Integrally Mounted Diesel Driven Permanent Magnet Generator;" and "Transport Refrigeration Unit With Synchronous Generator Power System." each of which were invented by Robert Chopko. Kenneth Barrett, and James Wilson, and each of which were likewise assigned to the assignees of the present invention. The teachings and disclosures of these applications are likewise incorporated herein by reference.

Figure 1:
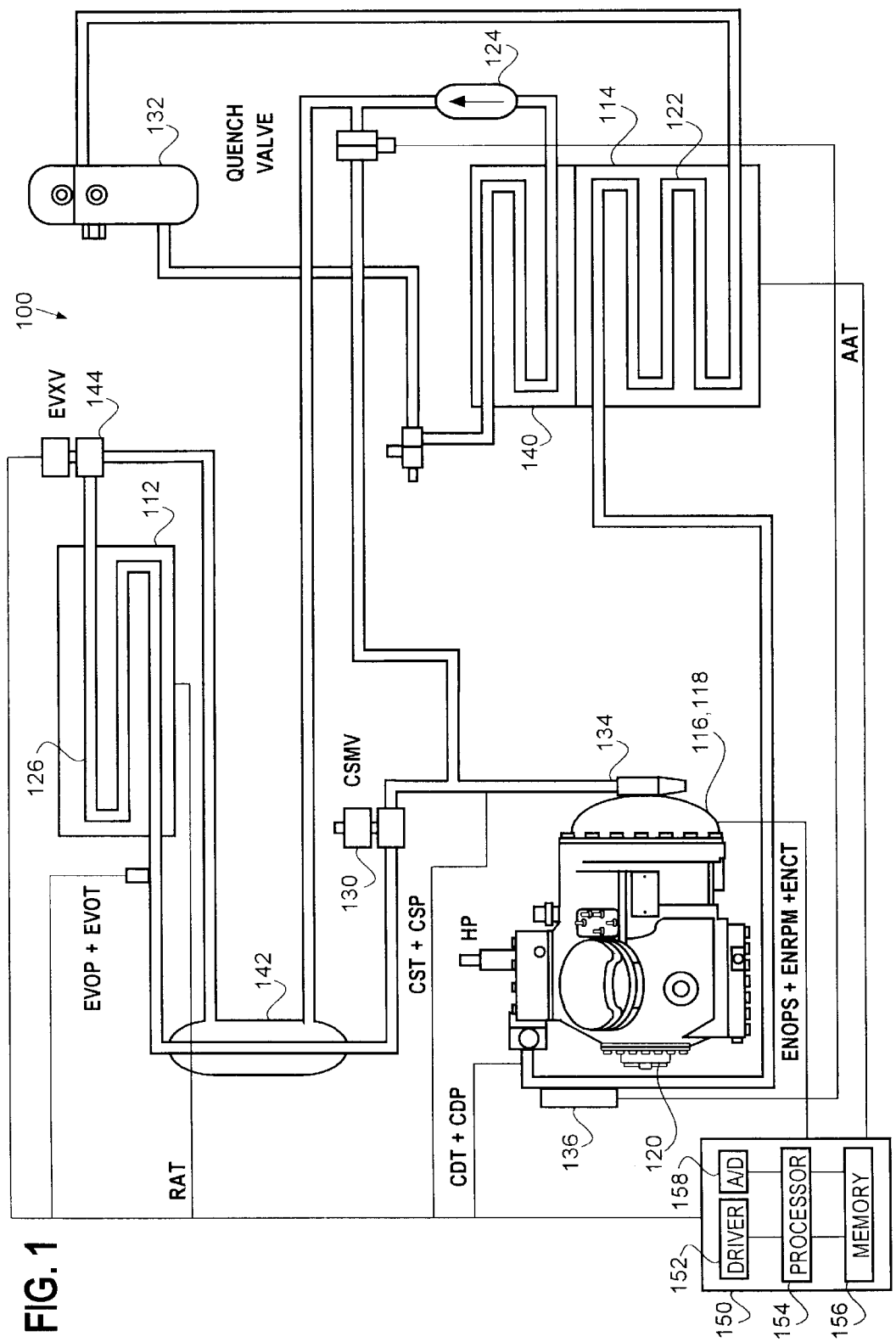
FIG. 1 shows a schematic of the transport refrigeration system of the present invention.

FIG. 1 illustrates a schematic representation of the transport refrigeration system 100 of the present invention. The refrigerant (which, in its most preferred embodiment is R404A) is used to cool the box air (i.e., the air within the container or trailer or truck) of the refrigeration transport system 100. is first compressed by a compressor 116, which is driven by a motor 118, which is most preferably an integrated electric drive motor driven by a synchronous generator 120 operating at low speed (most preferably 45 Hz) or high speed (most preferably 65 Hz). Another preferred embodiment of the present invention, however, provides for motor 118 to be a diesel engine, most preferably a four cylinder, 2200 cc displacement diesel engine which preferably operates at a high speed (about 1950 RPM) or at low speed (about 1350 RPM). The motor or engine 118 most preferably drives a 6 cylinder compressor 116 having a displacement of 600 cc, the compressor 116 further having two unloaders, each for selectively unloading a pair of cylinders under selective operating conditions.

In the condenser, the (preferably vapor state) refrigerant is compressed to a higher temperature and pressure. The refrigerant then moves to the air-cooled condenser 114, which includes a plurality of condenser coil fins and tubes 122, which receiver air, typically blown by a condenser fan (not shown). By removing latent heat through this step, the refrigerant condenses to a high pressure/high temperature liquid and flow to a receiver 132 that provides storage for excess liquid refrigerant during low temperature operation. From the receiver 132, the refrigerant flows through subcooler unit 140, then to a filter-drier 124 which keeps the refrigerant clean and dry, and then to a heat exchanger 142, which increases the refrigerant subcooling.

Finally, the refrigerant flows to an electronic expansion valve 144 (the "EXV"). As the liquid refrigerant passes through the orifice of the EXV, at least some of it vaporizes. The refrigerant then flows through the tubes or coils 126 of the evaporator 112, which absorbs heat from the return air (i.e., air returning from the box) and in so doing, vaporizes the remaining liquid refrigerant. The return air is preferably drawn or pushed across the tubes or coils 126 by at least one evaporator fan (not shown). The refrigerant vapor is then drawn from the exhanger 112 through a suction modulation valve (or "SMV") back into the compressor.

Figure 2:
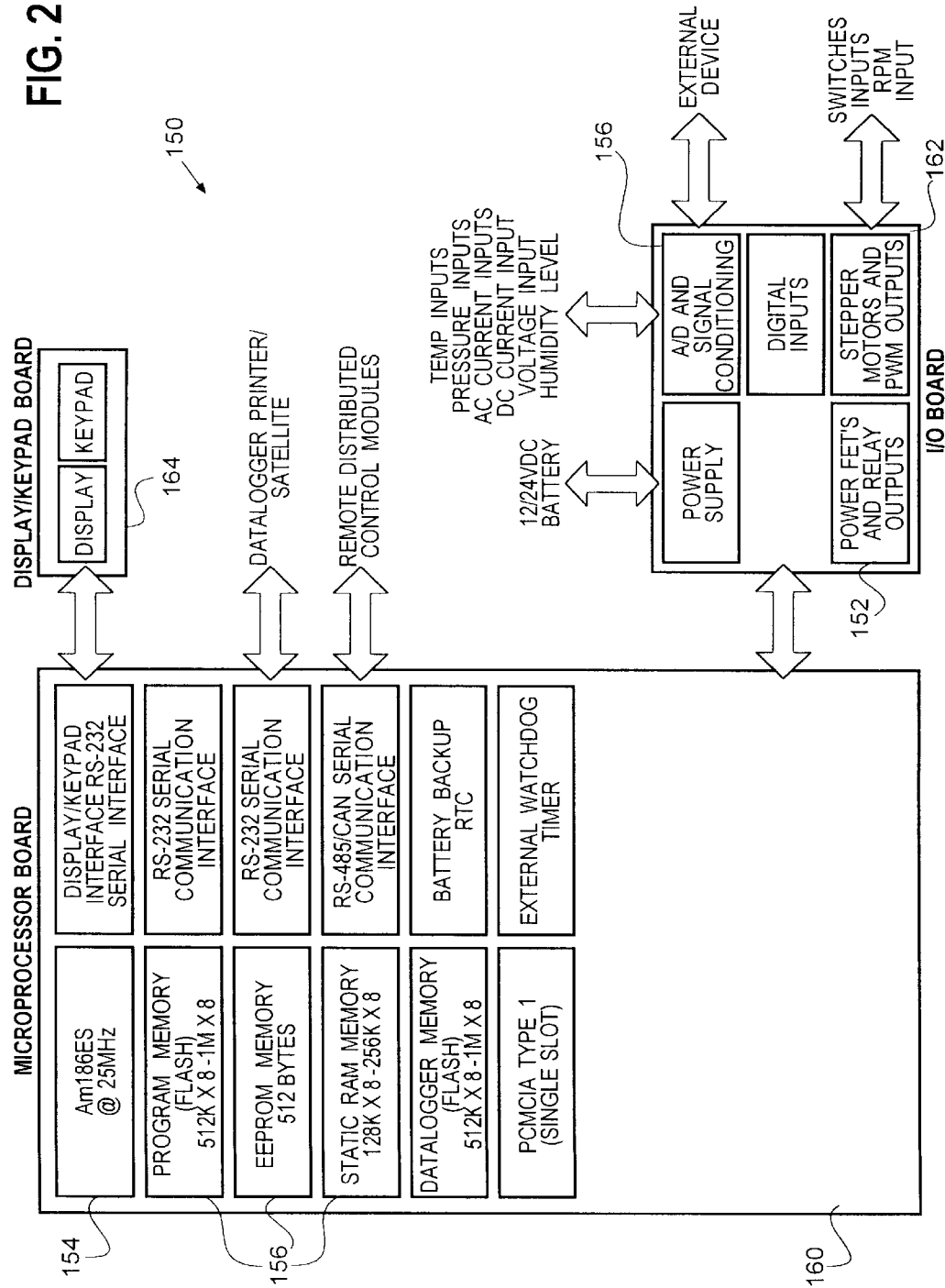
FIG. 2 shows a block schematic of a first preferred embodiment of a controller of the present invention.

Many of the points in the transport refrigeration system are monitored and controlled by a controller 150. As shown in FIGS. 2 and 2A Controller 150 preferably includes a microprocessor 154 and its associated memory 156. The memory 156 of controller 150 can (contain operator or owner preselected, desired values for various operating parameters within the system, including, but not limited to temperature set point for various locations within the system 100 or the box, pressure limits, current limits, engine speed limits, and any variety of other desired operating parameters or limits with the system 100. Controller 150 most preferably includes a microprocessor board 160 that contains microprocessor 154 and memory 156, an input/output (I/O) board 162, which contains an analog to digital converter 156 which receives temperature inputs and pressure inputs from various points in the system, AC current inputs, DC current inputs, voltage inputs and humidity level inputs. In addition, I/O board 162 includes drive circuits or field effect transistors ("FETs") receive signals or current from the controller 150 and in turn control various external or peripheral devices in the system 100, such as SMV 130 and EXV 144.

Among the specific sensors and transducers most preferably monitored by controller 150 includes: the return air temperature (RAT) sensor which inputs into the processor 154 a variable resistor value according to the evaporator return air temperature; the ambient air temperature (AAT) which inputs into microprocessor 154 a variable resistor value according to the ambient air temperature read in front of the condenser 114; the compressor suction temperature (CST) sensor; which inputs to the microprocessor a variable resistor value according to the compressor suction temperature; the compressor discharge temperature (CDT) sensor, which inputs to microprocessor 154 a resistor value according to the compressor discharge temperature inside the cylinder head of compressor 116; the evaporator outlet temperature (EVOT) sensor, which inputs to microprocessor 154 a variable resistor value according to the outlet temperature of evaporator 112; the generator temperature (GENT) sensor, which inputs to microprocessor 154 a resistor value according to the generator temperature; the engine coolant temperature (ENCT) sensor, which inputs to microprocessor 154 a variable resistor value according to the engine coolant temperature of engine 118; the compressor suction pressure (CSP) transducer, which inputs to microprocessor 154 a variable resistor value according to the compressor suction value of compressor 116; the the compressor discharge pressure (CDP) transducer, which inputs to microprocessor 154 a variable resistor value according to the compressor discharge value of compressor 116; the evaporator outlet pressure (EVOP) transducer which inputs to microprocessor 154 a variable resistor value according to the evaporator outlet pressure or evaporator 112; the engine oil pressure switch (ENOPS), which inputs to microprocessor 154 an engine oil pressure value from engine 118; and an engine RPM (ENRPM) transducer, which inputs to microprocessor 154 a variable resistor value according to the engine RPM of engine 118.

In the present invention, the controller 150 monitors and determines whether the current drawn from the system exceeds the current limit (and therefor exceeds the power limit) of the system 100. In the most preferred embodiment of the present invention, that current limit is about 25 amps. Thus, the implementation of the present invention calls for a current sensor (CT2) input to I/O board 156 which reflects current draw on the system. This value is forwarded to microprocessor 154, which compares that current draw value with a preselected current draw limit value stored in memory 156.

If the current draw value exceeds the preselected limit value, the microprocessor 154 implements an algorithm which increases the desired superheat level already stored in memory. As a result, microprocessor (through the drive circuit 162) issues a control signal which gradually closes the expansion valve 144 in order to achieve the desired superheat level. This closing of expansion valve 144 limits the mass flow rate of the refrigerant flowing through evaporator 112, and eventually results in a lower flow rate being handled by compressor 116, thus reducing the power consumption and the current draw on the system. The desired superheat level is further increased by controller 150 until either: a) the current draw sensed and input to the controller falls below an acceptable limit (preferrably at least 1 amp below the system current limit); or b) until the superheat level reaches a preselected limit.

Once the current draw input to the controller 150 falls below an acceptable limit, the algorithm within controller 150 proceeds to gradually lower the desired superheat level to maximize the refrigeration capacity of the system 100. The desired superheat can be decreased until it reaches its original base value, as stored in the memory 156 of controller 150. Thus, so long as the increase in superheat results in a drop of the current draw below the system limit, the system can optimize refrigerating capacity under power limit conditions by avoiding unnecessary closure of suction modulation valve 144.

It will be appreciated by those skilled in the art that various changes, additions, omissions, and modifications can be made to the illustrated embodiments without departing from the spirit of the present invention. All such modifications and changes are intended to be covered by the following claims.

We claim:

1. A process for optimizing capacity in a refrigeration unit under controlled, power limitation conditions, said process comprising the steps of:

i monitoring the current draw of the refrigeration unit;

ii comparing said current draw to a preset desired current draw limit; and iii selectively increasing the desired superheat setting when said current draw exceeds said preset desired current draw limit, thereby restricting the electronic expansion valve so as to decrease the mass flow of the refrigeration unit and to decrease the resulting power consumption of said refrigeration unit.

2. The process of claim 1 comprising the further steps of:

iv further monitoring the current draw of the refrigeration unit;

v comparing said current draw to said preset desired current draw limit; and vi selectively decreasing the desired superheat setting to its original value when said current draw falls below said preset desired current draw limit.

3. The process of claim 1 wherein the suction modulation valve of said refrigeration system is maintained at a constant opening throughout the steps of the process.

4. The process of claim 3 wherein the suction modulation valve of said refrigeration systems is maintained at its maximum opening.

5. The process of claim 1, wherein said refrigeration unit is a transport refrigeration unit.

6. The process of claim 1 wherein the step of selectively increasing the desired superheat is limited by an algorithm in said controller, said algorithm being defined as a function of the compressor discharge temperature.

* * * * *